Patented June 15, 1948

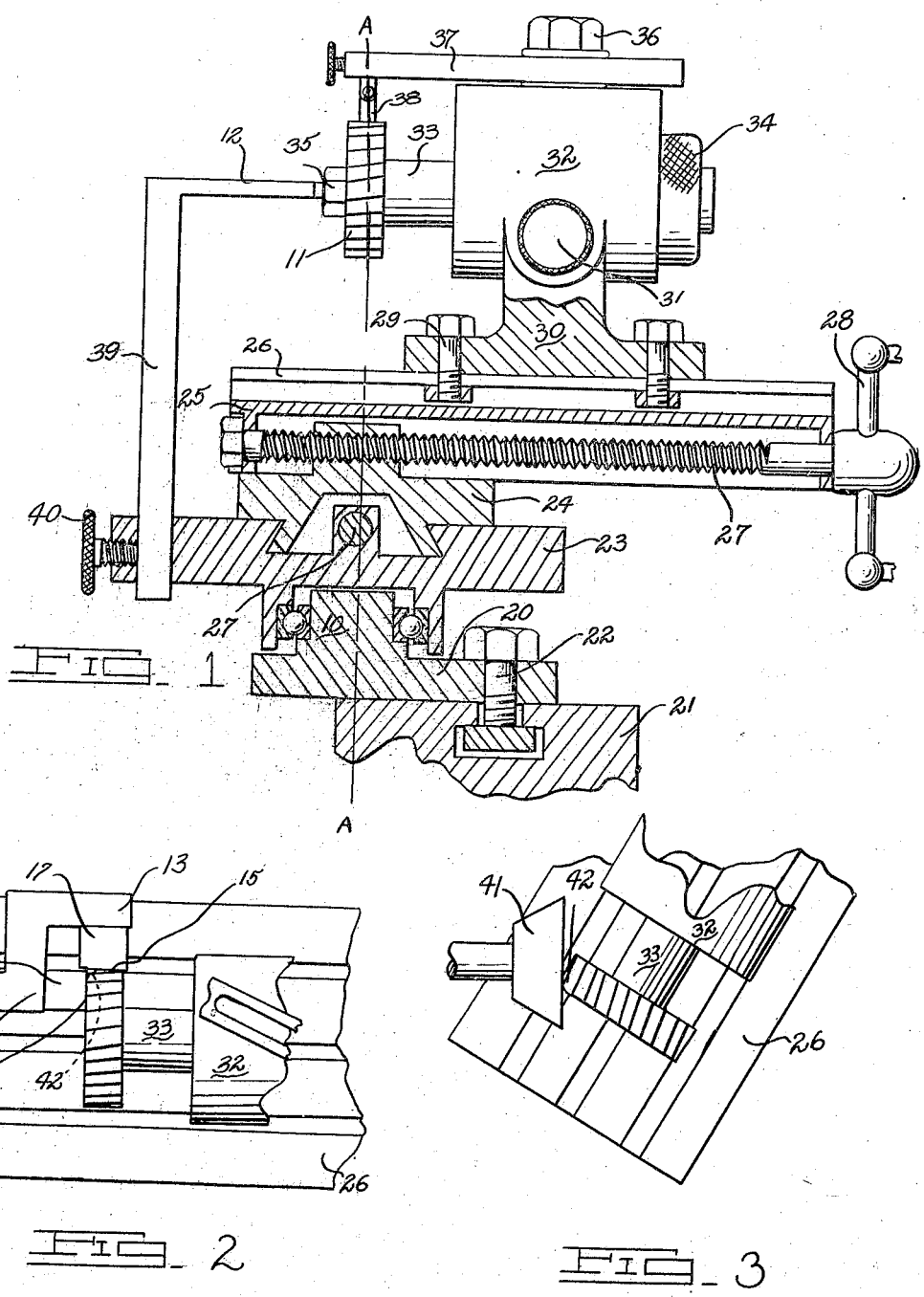

2,443,325

UNITED STATES PATENT OFFICE 2,443,325

RADIUS GRINDER FIXTURE

Jordan A. Post, Detroit, Mich.

Application March 28, 1946, Serial No. 657,813

3 Claims. (Cl. 51—225)

This invention relates to a grinder fixture and more particularly relates to a radius grinder fixture wherein the tool to be ground with a radius is accurately positioned relative to the axis or center from which the radius is taken.

The fixture consists of a post upon which two adjustable tables, one positioned on the other at right angles, are pivotally mounted, and a gauge on the base of the bottom table in fixed relation to the axis of the pivot post. This fixture is used to accurately position a cutting tool mounted on the top table relative to the axis of the pivot post so that the side and faces cutting areas or blades of the tool are positioned on equal radii. This is accomplished by having the cutter overhang the axis of the fixture by the amount of radius desired with the amount determined by the relation between the cutter and the gauge. Adjustments in amount are made by the use of precision blocks disposed between the gauge and the cutter as is more fully described hereinafter.

An object of the invention is to provide a gauge mounted on the horizontally pivoting table support that is in fixed radial relation to the axis of the horizontal pivot at two positions on the radius arc which positions the side and end cutting faces of a tool in the same radial relation to the axis or center of the horizontal pivot.

Another object of the invention is to provide two adjustable tables mounted on a horizontal pivot point each table being adjustable at 90° to the other.

A further object is to provide a tool bearing structure mounted on the tables above the horizontal pivot point that has a vertical pivot adaptable to accomplish a "back off" on the tool from the ground surface.

Other objects and advantages will be apparent from the following description and drawings in which:

Fig. 1 is an axial vertical cross section view, partly in elevation, of the invention;

Fig. 2 is a top view of the invention showing the gauge positioning the tool's faces on desired radius; and Fig. 3 is a top view of the radius being ground on the tool by a grinding wheel.

Post 10, Fig. 1, provides axis A—A about which tool 11 swings in an arc with the radius of the arc being determined by gauge 12, Figs. 1 and 2 which gauge has arm 13 and arm 14 disposed thereon at 90° angles to each other for positioning side cutters 15 and face cutters 16 respectively of the tool 11. Gauge blocks 17 are used in varying the length of the radius as desired. The arms 13 and 14 are equidistant from the axis and position the side 15 and face 16 of the tool 11 equidistant from the axis or, in other words, on equal radii for grinding both the side 15 and the face 16 of the tool 11 on equal radii.

Referring more particularly to the mechanism, the post 10 is equipped with flange 20 which is secured to grinder 21 by bolts 22 and integral with the grinder 21 are feed mechanisms, not shown, of conventional type. Pivotally disposed on the post 10 is a table 23 equipped with an adjustable slide 24, movable transversely thereon by means of a screw 27. Mounted on the slide 24 is a table 25 having a slide 26 extending in a direction of 90° with respect to the movement of slide 24 by a screw 27'. The screws 27 and 27' are provided with cranks for manual operation, the crank for the screw 27' being shown at 28. Secured to the slide 26 by bolts 29 is base or support 30 and pivotally mounted on the base 30 by pivot 31 is bearing member 32 housing spindle 33 which is equipped with knurled hand knob 34 for turning the spindle 33 in. The tool 11 is journaled in the spindle 33 and held against rotation relative to the spindle 33 by nut 35 and secured to the bearing member 32 by nut 36 is arm 37 which holds the cutter tooth indexing finger 38 in position. Mounted in the table 23 is gauge arm 39 supporting the gauge 12 which is secured by thumb nut 40.

In operation, the tool 11 is positioned on the spindle 33, and is to be ground, for example, with a one half inch radius. Assuming that the arms 13 and 14 are disposed on a one inch radius, blocks 17, of one half inch dimension, are attached to the gauge 12 as shown in Fig. 2. The cranks 28 are then turned until the faces 15 and 16 of the tool 11 are in contact with the blocks 17. The gauge is then removed leaving the tool 11 with its side and face cutting areas 15 and 16 both disposed on a one half inch radius from the common axis or center A—A.

The conventional feeds of the grinder 21 are now manipulated to advance the tool 11 to grinding wheel 41, Fig. 3, where rough grinding is initiated by placing either face 15 or 16 of the tool 11 flat against wheel 41 and then causing the table 23 to pivot on the post 10. After rough grinding, the finish grinding is accomplished by the same method with each tooth of the cutter being ground separately and each tooth being advanced by use of the knob 34 and positioned by the indexing means 38.

It can thus be seen that arc 42, Fig. 3, will be on an exact one half inch radius with the faces 15 and 16 of the tool 11 tangent to the arc 42.

When "back off" is desired from the cutting edge of the arc 42, the pivot 31 is adjusted to the desired amount, which inclines the tool vertically to the grinding wheel so that more material is removed back of the cutting edge than at the cutting edge by the grinding wheel.

Various other adaptations, substitutions, additions and omissions can be made to the invention without departing from the spirit thereof as the invention is bound only by the scope of the appended claims.

I claim:

1. In a device of the class described, a pivot, a gauge having two faces disposed at right angles located relative to the axis of said pivot, and means pivotally disposed on said pivot for supporting and adjusting the faces of a tool relative to the faces of said gauge whereby the faces of the tool are located on equal radii relative to the axis of said pivot.

2. In a device of the class described, a pivot, a gauge having two faces disposed at right angles located relative to the axis of said pivot, an adjustable table pivotally disposed on said pivot, a second adjustable table disposed at right angles on said adjustable table, and tool supporting means disposed on said second table whereby the faces of the tool are located on equal radii relative to the axis of said pivot.

3. In a device of the class described, a pivot, a gauge having two faces disposed at right angles located relative to the axis of said pivot, an adjustable table pivotally disposed on said pivot, a second adjustable table disposed at right angles on said adjustable table, tool supporting means disposed on said second table whereby the faces of the tool are located on equal radii relative to the axis of said pivot, and pivot means in said supporting means for inclining the tool relative to a grinding means whereby a "backed off" condition is accomplished in grinding the radius on the tool.

JORDAN A. POST.

REFERENCES CITED

The following references are of record in the file of this patent:

UNITED STATES PATENTS

| Number | Name | Date |
|---|---|---|
| 766,978 | Symington | Aug. 9, 1904 |
| 2,212,855 | Chrittenden | Aug. 27, 1940 |
| 2,332,510 | Franzen | Oct. 26, 1943 |
| 2,401,874 | Kilbride | June 11, 1946 |

FOREIGN PATENTS

| Number | Country | Date |
|---|---|---|
| 111,433 | Great Britain | Nov. 29, 1917 |